United States Patent
Dixon et al.

(10) Patent No.: US 9,373,115 B2
(45) Date of Patent: *Jun. 21, 2016

(54) CONTACTLESS PREPAID PRODUCT FOR TRANSIT FARE COLLECTION

(71) Applicants: Philip B Dixon, San Diego, CA (US); Ayman Hammad, Pleasanton, CA (US); Khalid El-Awady, Mountain View, CA (US)

(72) Inventors: Philip B Dixon, San Diego, CA (US); Ayman Hammad, Pleasanton, CA (US); Khalid El-Awady, Mountain View, CA (US)

(73) Assignee: Visa U.S.A. Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/248,920

(22) Filed: Apr. 9, 2014

(65) Prior Publication Data

US 2014/0217170 A1  Aug. 7, 2014

Related U.S. Application Data

(63) Continuation of application No. 11/966,233, filed on Dec. 28, 2007, now Pat. No. 8,738,485.

(51) Int. Cl.
*G06Q 20/04* (2012.01)
*G06Q 20/40* (2012.01)
(Continued)

(52) U.S. Cl.
CPC .......... *G06Q 20/4037* (2013.01); *G06K 19/073* (2013.01); *G06Q 20/20* (2013.01); *G06Q 20/3278* (2013.01); *G06Q 30/0281* (2013.01)

(58) Field of Classification Search
CPC ... G06Q 20/341; G06Q 20/04; G06Q 20/102; G06Q 20/363; G06Q 20/10; G06Q 20/40; G06Q 20/403; G06Q 30/06; G06Q 20/00; G06Q 20/085; G06Q 20/12; G06Q 20/20; G06Q 20/28; G06Q 20/367; G06Q 20/4016; G06Q 20/4093; G06Q 20/4097; G06Q 40/00; G07F 7/1008; G07F 7/0866; G07F 17/0014; G07F 17/32; G07F 7/08; G06K 7/0008; G07B 15/063
USPC .................... 705/13, 22, 26.1, 35, 39, 40, 50; 235/59 R, 375, 379, 380, 381, 384, 385, 235/487; 703/6; 707/999.01; 709/226; 711/167; 713/182; 340/910; 604/20; 194/205; 379/121.02; 463/25; 380/202
See application file for complete search history.

(56) References Cited

U.S. PATENT DOCUMENTS

| 2,328,654 A | 9/1943 | Lake et al. |
| 3,008,635 A * | 11/1961 | Sakalay ................ G06F 3/0227 235/59 R |

(Continued)

FOREIGN PATENT DOCUMENTS

| CN | 1436431 A | 8/2008 |
| EP | 0 254 595 B1 | 1/1988 |

(Continued)

OTHER PUBLICATIONS

Taiwanese Notice of Allowance mailed on Sep. 19, 2014 for TW Patent Application No. 97145235, with English translation, 3 pages.

(Continued)

*Primary Examiner* — James Trammell
*Assistant Examiner* — Sanjeev Malhorta
(74) *Attorney, Agent, or Firm* — Kilpatrick Townsend & Stockton LLP (57) ABSTRACT

Transaction processing in an offline environment for a prepaid product comprising a portable consumer device includes responding to presentation of the prepaid product at a reader for offline processing by initiating operation of the prepaid product, receiving data from the prepaid product at the reader that indicates the prepaid product is associated with a prepaid account balance, determining that the prepaid product is in a negative balance condition, and taking preventive action in response to the negative balance condition such that future acceptance of the prepaid product at a reader is prevented.

17 Claims, 4 Drawing Sheets

(51) Int. Cl.
*G06Q 20/20* (2012.01)
*G06Q 20/32* (2012.01)
*G06Q 30/02* (2012.01)
*G06K 19/073* (2006.01)

(56) References Cited

U.S. PATENT DOCUMENTS

| | | | |
|---|---|---|---|
| 4,303,904 A * | 12/1981 | Chasek | G06Q 20/3433 235/384 |
| 4,672,182 A | 6/1987 | Hirokawa | |
| 4,736,094 A | 4/1988 | Yoshida | |
| 4,822,985 A | 4/1989 | Boggan et al. | |
| 4,851,650 A | 7/1989 | Kitade | |
| 4,857,893 A | 8/1989 | Carroll | |
| 4,870,259 A | 9/1989 | Boggan et al. | |
| 4,899,036 A | 2/1990 | McCrindle et al. | |
| 4,908,521 A | 3/1990 | Boggan et al. | |
| 4,928,001 A | 5/1990 | Masada | |
| 4,943,707 A | 7/1990 | Boggan | |
| 5,103,079 A | 4/1992 | Barakai et al. | |
| 5,191,193 A | 3/1993 | Le Roux | |
| 5,286,955 A | 2/1994 | Klosa | |
| 5,337,063 A | 8/1994 | Takahira | |
| 5,360,967 A | 11/1994 | Perkin et al. | |
| 5,396,558 A | 3/1995 | Ishiguro et al. | |
| 5,477,038 A | 12/1995 | Levine et al. | |
| 5,485,520 A * | 1/1996 | Chaum | G06K 7/0008 235/379 |
| 5,500,513 A | 3/1996 | Langhans et al. | |
| 5,503,774 A | 4/1996 | Brons et al. | |
| 5,550,734 A | 8/1996 | Tarter et al. | |
| 5,562,550 A | 10/1996 | Chartrand | |
| 5,585,614 A | 12/1996 | VonBallmoos | |
| 5,585,787 A | 12/1996 | Wallerstein | |
| 5,649,118 A | 7/1997 | Carlisle et al. | |
| 5,801,943 A * | 9/1998 | Nasburg | G08G 1/0104 340/910 |
| 5,828,044 A | 10/1998 | Jun et al. | |
| 5,844,230 A | 12/1998 | Lalonde | |
| 5,864,830 A | 1/1999 | Armetta et al. | |
| 5,883,377 A | 3/1999 | Chapin, Jr. | |
| 5,903,830 A | 5/1999 | Joao et al. | |
| 5,917,965 A | 6/1999 | Cahill et al. | |
| 5,929,428 A * | 7/1999 | Iijima | G06Q 20/341 235/487 |
| 5,946,669 A | 8/1999 | Polk | |
| 5,953,710 A | 9/1999 | Fleming | |
| 5,984,180 A | 11/1999 | Albrecht | |
| 5,984,191 A | 11/1999 | Chapin, Jr. | |
| 5,991,527 A * | 11/1999 | Plint | G05B 19/41885 703/6 |
| 5,991,749 A * | 11/1999 | Morrill, Jr. | G06Q 20/04 705/13 |
| 6,021,943 A | 2/2000 | Chastain | |
| 6,038,597 A | 3/2000 | Van Wyngarden | |
| 6,039,245 A | 3/2000 | Symonds et al. | |
| 6,044,360 A | 3/2000 | Picciallo | |
| 6,097,292 A * | 8/2000 | Kelly | G06K 7/0008 235/385 |
| 6,101,477 A | 8/2000 | Hohle et al. | |
| 6,105,009 A | 8/2000 | Cuervo | |
| 6,119,107 A | 9/2000 | Polk | |
| 6,138,917 A | 10/2000 | Chapin, Jr. | |
| 6,176,425 B1 | 1/2001 | Harrison et al. | |
| 6,179,205 B1 | 1/2001 | Sloan | |
| 6,185,307 B1 * | 2/2001 | Johnson, Jr. | G06Q 20/027 380/270 |
| 6,199,762 B1 | 3/2001 | Hohle | |
| 6,216,227 B1 | 4/2001 | Goldstein et al. | |
| 6,402,029 B1 | 6/2002 | Gangi | |
| 6,422,462 B1 | 7/2002 | Cohen | |
| 6,453,335 B1 * | 9/2002 | Kaufmann | H04L 67/20 707/999.01 |
| 6,473,500 B1 | 10/2002 | Risafi et al. | |
| 6,502,745 B1 | 1/2003 | Stimson et al. | |
| 6,529,725 B1 | 3/2003 | Joao et al. | |
| 6,549,912 B1 | 4/2003 | Chen | |
| 6,577,229 B1 * | 6/2003 | Bonneau | G06K 7/0008 235/379 |
| 6,587,835 B1 | 7/2003 | Treyz et al. | |
| 6,609,655 B1 * | 8/2003 | Harrell | G07B 15/063 235/375 |
| 6,615,189 B1 | 9/2003 | Phillips et al. | |
| 6,615,190 B1 | 9/2003 | Slater | |
| 6,629,591 B1 * | 10/2003 | Griswold | G07F 1/06 194/205 |
| 6,655,587 B2 * | 12/2003 | Andrews | G06Q 20/363 235/381 |
| 6,685,088 B1 | 2/2004 | Royer et al. | |
| 6,726,098 B2 | 4/2004 | Schilling | |
| 6,729,549 B2 * | 5/2004 | Hamann | G06K 17/00 235/379 |
| 6,732,080 B1 | 5/2004 | Blants | |
| 6,859,650 B1 | 2/2005 | Ritter | |
| 6,892,187 B2 | 5/2005 | Phillips et al. | |
| 6,915,277 B1 | 7/2005 | Manchester et al. | |
| 6,934,689 B1 | 8/2005 | Ritter et al. | |
| 6,938,821 B2 | 9/2005 | Gangi | |
| 6,970,891 B1 | 11/2005 | Deo et al. | |
| 7,054,838 B2 | 5/2006 | Sutton et al. | |
| 7,083,087 B1 | 8/2006 | Gangi | |
| 7,092,697 B1 | 8/2006 | Kupsh et al. | |
| 7,096,003 B2 | 8/2006 | Joao et al. | |
| 7,114,179 B1 | 9/2006 | Ritter et al. | |
| 7,130,828 B2 | 10/2006 | Phillips et al. | |
| 7,163,145 B2 | 1/2007 | Cohagan et al. | |
| 7,165,049 B2 | 1/2007 | Slater | |
| 7,171,388 B2 | 1/2007 | Phillips et al. | |
| 7,172,112 B2 | 2/2007 | Bonalle et al. | |
| 7,174,314 B2 | 2/2007 | Phillips et al. | |
| 7,174,315 B2 | 2/2007 | Phillips et al. | |
| 7,174,316 B2 | 2/2007 | Phillips et al. | |
| 7,174,317 B2 | 2/2007 | Phillips et al. | |
| 7,209,757 B2 | 4/2007 | Naghian et al. | |
| 7,225,155 B1 | 5/2007 | Polk | |
| 7,268,667 B2 | 9/2007 | Beenau et al. | |
| 7,268,668 B2 | 9/2007 | Beenau et al. | |
| 7,317,823 B1 | 1/2008 | Price et al. | |
| 7,360,699 B2 | 4/2008 | Cohagan et al. | |
| 7,363,273 B2 | 4/2008 | Phillips et al. | |
| 7,433,452 B2 | 10/2008 | Taylor et al. | |
| 7,437,362 B1 | 10/2008 | Ben-Natan | |
| 7,447,662 B2 | 11/2008 | Gibson | |
| 7,469,827 B2 | 12/2008 | Katragadda et al. | |
| 7,506,804 B2 | 3/2009 | Zajkowski et al. | |
| 7,527,208 B2 | 5/2009 | Hammad et al. | |
| 7,529,563 B1 | 5/2009 | Pitroda | |
| 7,594,611 B1 | 9/2009 | Arrington, III | |
| 7,959,074 B1 | 6/2011 | Chopra et al. | |
| 8,118,223 B2 | 2/2012 | Hammad et al. | |
| 8,376,227 B2 | 2/2013 | Hammad et al. | |
| 8,386,349 B2 | 2/2013 | Dixon et al. | |
| 8,523,069 B2 | 9/2013 | Hammad et al. | |
| 8,688,554 B2 | 4/2014 | Hammad et al. | |
| 8,700,513 B2 | 4/2014 | Hammad et al. | |
| 8,712,892 B2 | 4/2014 | Dixon et al. | |
| 8,733,663 B2 | 5/2014 | Hammad et al. | |
| 8,738,485 B2 | 5/2014 | Dixon et al. | |
| 2001/0026679 A1 | 10/2001 | Koshino et al. | |
| 2001/0033447 A1 | 10/2001 | Miles | |
| 2001/0051920 A1 | 12/2001 | Joao et al. | |
| 2001/0056536 A1 | 12/2001 | Everett et al. | |
| 2002/0002534 A1 | 1/2002 | Davis et al. | |
| 2002/0010603 A1 | 1/2002 | Doi et al. | |
| 2002/0038336 A1 | 3/2002 | Abileah et al. | |
| 2002/0050528 A1 | 5/2002 | Everett et al. | |
| 2002/0077122 A1 | 6/2002 | Yule | |
| 2002/0103865 A1 | 8/2002 | Lilly | |
| 2002/0111919 A1 | 8/2002 | Weller et al. | |
| 2002/0118118 A1 | 8/2002 | Myllymaki et al. | |
| 2002/0145984 A1 | 10/2002 | Babu et al. | |
| 2002/0152123 A1 | 10/2002 | Giordano et al. | |
| 2002/0152163 A1 * | 10/2002 | Bezos | G06Q 20/00 705/40 |

(56) References Cited

U.S. PATENT DOCUMENTS

| | | |
|---|---|---|
| 2002/0156807 A1 | 10/2002 | Dieberger |
| 2002/0163884 A1 | 11/2002 | Peles et al. |
| 2002/0194138 A1 | 12/2002 | Dominguez et al. |
| 2003/0028814 A1 | 2/2003 | Carta et al. |
| 2003/0034389 A1 | 2/2003 | Cantini |
| 2003/0050087 A1 | 3/2003 | Kwon |
| 2003/0050906 A1 | 3/2003 | Clifton-Bligh |
| 2003/0053609 A1 | 3/2003 | Risafi et al. |
| 2003/0061111 A1 | 3/2003 | Dutta et al. |
| 2003/0083944 A1 | 5/2003 | Duvall et al. |
| 2003/0105711 A1 | 6/2003 | O'Neil |
| 2003/0135487 A1 | 7/2003 | Beyer et al. |
| 2003/0137435 A1 | 7/2003 | Haddad et al. |
| 2003/0144894 A1* | 7/2003 | Robertson ............ G06Q 10/06 709/226 |
| 2003/0174839 A1 | 9/2003 | Yamagata et al. |
| 2003/0181845 A1* | 9/2003 | Orton .................... A61N 1/326 604/20 |
| 2003/0216927 A1 | 11/2003 | Sridhar et al. |
| 2003/0221195 A1 | 11/2003 | Bizet |
| 2004/0000585 A1 | 1/2004 | Silverbrook et al. |
| 2004/0006536 A1* | 1/2004 | Kawashima .......... G06Q 20/04 705/39 |
| 2004/0016801 A1 | 1/2004 | Newsome et al. |
| 2004/0039686 A1 | 2/2004 | Klebanoff |
| 2004/0117300 A1 | 6/2004 | Jones et al. |
| 2004/0139021 A1 | 7/2004 | Reed |
| 2004/0155960 A1 | 8/2004 | Wren et al. |
| 2004/0249745 A1 | 12/2004 | Baaren |
| 2004/0256455 A1 | 12/2004 | Fukushima et al. |
| 2005/0018574 A1 | 1/2005 | Jenkins et al. |
| 2005/0036391 A1 | 2/2005 | Tomiie et al. |
| 2005/0053211 A1* | 3/2005 | Bevente ................ H04M 15/00 379/121.02 |
| 2005/0086160 A1 | 4/2005 | Wong et al. |
| 2005/0103839 A1* | 5/2005 | Hewel .................. G06Q 20/341 235/380 |
| 2005/0127168 A1 | 6/2005 | Phillips et al. |
| 2005/0165695 A1 | 7/2005 | Berardi et al. |
| 2005/0173518 A1 | 8/2005 | Takayama |
| 2005/0185774 A1 | 8/2005 | Grear et al. |
| 2005/0203842 A1 | 9/2005 | Sanchez et al. |
| 2005/0234778 A1* | 10/2005 | Sperduti ............... G06Q 20/20 705/22 |
| 2005/0240743 A1* | 10/2005 | Eng ....................... G06F 3/0611 711/167 |
| 2005/0242176 A1 | 11/2005 | Roberge et al. |
| 2005/0242177 A1 | 11/2005 | Roberge et al. |
| 2005/0269417 A1 | 12/2005 | Wood |
| 2006/0100933 A1 | 5/2006 | Fujita et al. |
| 2006/0106650 A1 | 5/2006 | Bush |
| 2006/0161435 A1 | 7/2006 | Atef et al. |
| 2006/0240862 A1 | 10/2006 | Neven et al. |
| 2006/0258337 A1 | 11/2006 | Fujita et al. |
| 2006/0278704 A1 | 12/2006 | Saunders et al. |
| 2006/0282528 A1 | 12/2006 | Madams et al. |
| 2006/0287964 A1 | 12/2006 | Brown |
| 2007/0023504 A1 | 2/2007 | Blankenship et al. |
| 2007/0045403 A1* | 3/2007 | Slonecker, Jr. ....... G06Q 20/354 235/380 |
| 2007/0051797 A1 | 3/2007 | Randolph-Wall et al. |
| 2007/0075140 A1 | 4/2007 | Guez et al. |
| 2007/0076872 A1* | 4/2007 | Juneau ................. H04L 63/1408 380/202 |
| 2007/0087818 A1* | 4/2007 | Walker .................. G07F 17/32 463/25 |
| 2007/0100664 A1 | 5/2007 | Seib et al. |
| 2007/0100691 A1 | 5/2007 | Patterson |
| 2007/0100754 A1* | 5/2007 | Brown .................. G06Q 20/26 705/50 |
| 2007/0103277 A1 | 5/2007 | Yuk et al. |
| 2007/0145135 A1 | 6/2007 | Jogand-Coulomb et al. |
| 2007/0168674 A1* | 7/2007 | Nonaka ................ G06Q 20/341 713/182 |
| 2008/0033880 A1 | 2/2008 | Fiebiger et al. |
| 2008/0054072 A1 | 3/2008 | Katragadda et al. |
| 2008/0116264 A1 | 5/2008 | Hammad et al. |
| 2008/0120214 A1* | 5/2008 | Steele .................. G06Q 20/341 705/35 |
| 2008/0128513 A1 | 6/2008 | Hammad et al. |
| 2008/0156873 A1 | 7/2008 | Wilhelm et al. |
| 2008/0162295 A1* | 7/2008 | Bedier .................. G06Q 20/04 705/26.1 |
| 2008/0172341 A1 | 7/2008 | Crandell |
| 2008/0201212 A1 | 8/2008 | Hammad et al. |
| 2008/0203151 A1 | 8/2008 | Hammad et al. |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0230600 A1 | 9/2008 | Black et al. |
| 2009/0171682 A1 | 7/2009 | Dixon et al. |
| 2009/0184163 A1 | 7/2009 | Hammad et al. |
| 2009/0239512 A1 | 9/2009 | Hammad et al. |
| 2014/0008433 A1 | 1/2014 | Hammad et al. |
| 2014/0183259 A1 | 7/2014 | Hammad et al. |
| 2014/0214658 A1 | 7/2014 | Hammad et al. |

FOREIGN PATENT DOCUMENTS

| | | |
|---|---|---|
| EP | 0 795 165 B1 | 9/2000 |
| GB | 2 267 626 A | 12/1993 |
| JP | 2004-295481 A2 | 10/2004 |
| JP | 2006-209370 A2 | 8/2006 |
| KR | 100287012 B1 | 1/2001 |
| RU | 2 222 046 C2 | 1/2004 |
| TW | 200602937 A | 1/2006 |
| TW | 200734951 A | 6/2007 |
| WO | WO 01/91485 A1 | 11/2001 |
| WO | WO 02/093307 A2 | 11/2002 |
| WO | WO 02/093307 A3 | 11/2002 |
| WO | WO 2004/079611 A1 | 9/2004 |
| WO | WO 2005/121975 A1 | 12/2005 |
| WO | WO 2006/124808 A2 | 11/2006 |
| WO | WO 2007/139302 A1 | 12/2007 |

OTHER PUBLICATIONS

"SmartTrip," version edited by Schumin Web on Sep. 4, 2005, downloaded from the internet at http://www.wikipedia.org, on Feb. 24, 2011, 4 pages.

"The NYC Subway Trial | MasterCard® | About the Trial", downloaded from the Internet at http://www.mastercard.com/us/paypass/subway/about/subwaytrial_newsrelease_30Jan2006html on Jun. 11, 2008, pp. 1-2.

"Metrorail, Washington, D.C.," downloaded from the internet at http://www.en.wikipedia.org, on Jul. 30, 2008, pp. 1-3.

American Public Transportation Association; "Account Linked Payment Service Concept White Paper", downloaded from the internet at http://www.speacq.com/industry/APTA_FSP_ALPS_White_Paper.pdf; (last modified Jan. 25, 2007), 33 pages.

Amtel; "Understanding the Requirements of ISO/IEC 14443 for Type B Proximity Contactless Identification Cards"; Nov. 2005; 28 pages.

Australian Office Action mailed on Oct. 4, 2011, for AU Patent Application No. 2008221392, 2 pages.

Australian Notice of Acceptance mailed on Jan. 15, 2012, for AU Patent Application No. 2008221392, 1 page.

Chinese Office Action, with English Translation, mailed on Jun. 2, 2010, for CN Patent Application No. 200780043545.9, 9 pages.

Chinese Office Action, with English Translation, mailed on Nov. 30, 2011, for CN Patent Application No. 200780043545.9, 10 pages.

Chinese Office Action, with English Translation, mailed on Mar. 1, 2012, for CN Patent Application No. 200780043545.9, 8 pages.

Definition of "Smart Card"; 2000; *Collin's Dictionary of Computing*; downloaded from the internet on Sep. 15, 2011; 1 page.

Definition of "Smart Card"; 2001; *Hargrave's Communications Dictionary*; downloaded from the internet on Sep. 15, 2011; 1 page.

Definition of "Smart Card"; 2003; *Webster's New World Computer Dictionary*; downloaded from the internet on Sep. 15, 2011; 1 page.

Definition of "Smart Card"; Date Unknown; Netlingo.com; downloaded from the internet on Sep. 15, 2011; 1 page.

(56) References Cited

OTHER PUBLICATIONS

Definition of "Smart Card"; *Dictionary of Computing*; 2008; downloaded from the internet on Sep. 15, 2011; 1 page.
Extended European Search Report mailed Nov. 12, 2010, for EP Patent Application No. 07843170.7, 8 pages.
Extended European Search Report mailed on Jan. 28, 2011 for European Patent Application No. 08743584.8, 5 pages.
Extended European Search Report mailed on Apr. 25, 2012, for EP Patent Application No. 07854911.0, 8 pages.
International Preliminary Report on Patentability mailed Jun. 18, 2009 in Application No. PCT/US2007/086342, 7 pages.
International Search Report mailed on Jul. 21, 2008, for PCT Patent Application No. PCT/US2007/086342, 1 page.
International Search Report mailed on Jul. 31, 2008, for PCT Patent Application No. PCT/US2008/055195, 1 page.
International Search Report mailed on Aug. 1, 2008, for PCT/US2008/055196, 1 page.
International Search Report mailed on Aug. 4, 2008, for PCT Patent Application No. PCT/US2008/055192, 1 page.
International Search Report mailed on Aug. 15, 2008, for PCT Patent Application No. PCT/US2007/079453, 1 page.
International Search Report mailed on Jan. 9, 2009, for PCT/US2008/083181, 1 page.
International Search Report and Written Opinion mailed Jul. 6, 2010 in SG Application No. 200902024-9, 19 pages.
Notice from the European Patent Office dated Oct. 1, 2007 concerning business methods, Official Journal EPO, Nov. 2007, p. 592-593.
Schellhorn, Gerhard; "Verification of a Formal Security Model for Multiplicative Smart Cards"; *Proceedings of the European Symposium on Research in Computersecurity*; Oct. 4, 2000; pp. 17-36.
Russian Office Action, with English Translation, mailed on Jun. 27, 2012 for RU Patent Application No. 2010131458, 12 pages.
Russian Notification of Results of Patentability Check issued in Application No. 2010131458 on Oct. 29, 2012, 8 pages.
Russian Office Action, English Translation, mailed on Jul. 12, 2013 for RU Patent Application No. 2010131458/08, 5 pages.
Taiwanese Office Action and Search Report mailed on Feb. 19, 2014 for TW Patent Application No. 97145235, 9 pages.
Japanese Office Action mailed on Mar. 14, 2014 for JP Patent Application No. 2009-551832 with English translation, 4 pages.
European Office Action mailed on Jan. 24, 2014 for EP Application No. 08743584.8, 5 pages.
Korean Office Action mailed on May 28, 2014 for KR Patent Application No. 10-2009-7013989, with English Translation, 5 pages.
Canadian Office Action mailed on Jun. 27, 2014 for CA Patent Application No. 2,671,739, 2 pages.
Korean Office Action mailed on Oct. 22, 2014 for KR Patent Application No. 10-2014-7021414, with English translation, 6 pages.
Non-Final Office Action mailed on Jul. 23, 2015 for U.S. Appl. No. 14/242,754, 9 pages.
Canadian Office Action mailed on Oct. 24, 2014 for CA Patent Application No. 2,679,440, 4 pages.

\* cited by examiner

CONTACTLESS PREPAID PRODUCT FOR TRANSIT FARE COLLECTION

CROSS-REFERENCES TO RELATED APPLICATIONS

This application is a continuation application of and claims the benefit of priority of U.S. patent application Ser. No. 11/966,233, entitled, "Contactless Prepaid Product For Transit Fare Collection," filed Dec. 28, 2007, which is herein incorporated by reference in its entirety for all purposes. This application is related to patent applications entitled "Verification of a Portable Consumer Device in an Offline Environment" to A. Hammad et al. U.S. patent application Ser. No. 11/680,592, filed Feb. 28, 2007, issued as U.S. Pat. No. 8,386,349; "Fraud Prevention for Transit Fare Collection" to A. Hammad et al. U.S. patent application Ser. No. 11/680,589, filed Feb. 28, 2007; "Authentication of a Data Card Using a Transit Verification Value" by A. Hammad et al. U.S. patent application Ser. No. 11/680,594, filed Feb. 28, 2007, issued as U.S. Pat. No. 8,346,639; "Bank Issued Contactless Payment Card Used in Transit Fare Collection" to A. Hammad et al. U.S. patent application Ser. No. 11/566,614, filed Dec. 4, 2006, issued as U.S. Pat. No. 7,527,208; and "Mobile Transit Fare Payment" to A. Hammad et al. U.S. patent application Ser. No. 11/536,296, filed Sep. 28, 2006, issued as U.S. Pat. No. 8,523,069. The contents of these related applications are herein incorporated by reference_in their entirety for all purposes.

BACKGROUND

In a conventional consumer card payment transaction, a cardholder presents a merchant with a portable consumer device such as a credit card or payment card to pay for goods or services. The processing of the transaction involves the merchant, an acquirer, a payment processing network, and a card issuer. The merchant initiates online processing by transmitting an authorization request message that proceeds from the acquirer, through the payment processing network, and to the issuer. The issuer verifies that the card number, transaction amount, and other information are valid and returns an authorization response message for the transaction back to the merchant. As part of such online processing, a variety of fraud prevention measures can by used by issuers to guard against the unauthorized (or wrongly authorized) use of such cards.

Under some situations, offline processing using a portable consumer device such as a payment card is desirable. For example, transit fare processing from payment cards is typically conducted offline, because of transaction speed requirements at transit fare collection devices such as subway turnstiles or bus fareboxes For transit transactions, thirty to forty-five customers (passengers) are processed per minute, so there is insufficient time for the merchant (the transit system) to go online to the issuer for transaction authorization. Such throughput demands will only allow about 300 ms per transaction. Moreover, such transactions typically utilize some form of contactless card for payment that does not require physical contact between the card presented for payment and the transit fare collection device of the transit system.

Various forms of offline card authentication have been proposed to prevent potential counterfeit card attacks and the potential organized fraud in these situations. See, for example, the related applications patent applications entitled "Verification of a Portable Consumer Device in an Offline Environment" to A. Hammad et al. U.S. patent application Ser. No. 11/680,592 filed Feb. 28, 2007; "Fraud Prevention for Transit Fare Collection" to A. Hammad et al. U.S. patent application Ser. No. 11/680,589 filed Feb. 28, 2007; "Authentication of a Data Card Using a Transit Verification Value" by A. Hammad et al. U.S. patent application Ser. No. 11/680,594 filed Feb. 28, 2007; "Bank Issued Contactless Payment Card Used in Transit Fare Collection" to A. Hammad et al. U.S. patent application Ser. No. 11/566,614 filed Dec. 4, 2006; and "Mobile Transit Fare Payment" to A. Hammad et al. U.S. patent application Ser. No. 11/536,296 filed Sep. 28, 2006.

In this discussion, "contactless cards" for payment systems will include contactless "smart" cards and also contactless smart chips. A smart card is generally defined as a pocket-sized card (or other portable consumer device) that is embedded with either a microprocessor and one or more memory chips, or as one or more memory chips with non-programmable logic. The microprocessor-type smart card typically can implement certain data processing functions, such as to add, delete, or otherwise manipulate information stored in a memory location of the smart card. In contrast, the memory-chip-type card (for example, a pre-paid phone card) can only act as a file to hold data that is manipulated by the reading device to perform a predefined operation, such as debiting a charge from a pre-established balance held in the memory or secure memory. Smart cards, unlike magnetic stripe cards (such as conventional credit cards), can implement a variety of functions and contain a variety of types of information on the card. Therefore, in some applications they do not require access to remote databases for the purpose of user authentication or record keeping at the time of a transaction. A smart chip is a semiconductor device that is capable of performing most, if not all, of the functions of a smart card, but may be embedded in another device.

A contactless smart card is a smart card that incorporates a means of communicating with the card reader or terminal without the need for direct contact. Thus, such cards may effectively be "swiped" by passing them close to the card reader or terminal. Such contactless smart cards typically communicate with the card reader or terminal using RF (radio-frequency) technology, wherein proximity to an antenna causes data transfer between the card and the reader or terminal. Contactless smart cards have found uses in banking and other applications, as it may not be necessary to remove them from one's wallet or pocket in order to complete a transaction. Furthermore, because of the growing interest in such smart cards, standards have been developed that govern the operation and interfaces for contactless smart cards, such as the ISO 14443 standard. A variety of financial transactions, such as retail payment and transit fare collection, have adopted the ISO 14443 standard for contactless smart cards.

As noted above, the transit environment is an environment in which offline processing is the usual mode of processing at the point of sale. The transit environment inherently serves a large population of patrons that either do not possess, or cannot acquire, a credit card or payment card from a financial institution. If they did possess such a card that also had contactless payment capability, it could be utilized in the transit environment to pay fares as described in the related applications referenced above. Without a contactless payment card from a participating financial institution, these transit patrons may not be able to take advantage of all fare discounts, loyalty incentives, or features that are enjoyed by other patrons who have a contactless payment card from a financial institution. Also, if patrons are using a variety of fare media types (e.g., an agency-issued fare media and/or cash in addition to bank-issued contactless cards), then the transit agency must service multiple types of media, resulting in a less-efficient or more costly fare collection system.

Prepaid portable consumer devices, such as prepaid cards or debit cards and the like, have been proposed for use in the transit environment. Prepaid cards or debit cards in this context will be understood to mean accounts administered by financial institutions or issuers with associated prepaid funds that are decremented with each use of the card. In general, these cards were created for use in the retail on-line payment environment. For example, some prepaid cards may be "gift" cards with a beginning value or account balance that is decremented with each transaction until the card balance reaches zero, at which time the card can be disposed. These may generally be anonymous cards in the sense that they do not require the cardholder (the bearer of the card) to maintain a bank relationship of any kind to use the card. Other prepaid cards may be associated with accounts that can be "reloaded" so as to increase or restore the account balance to a greater level. These reloadable cards may be reloaded through many mechanisms, such as the "ReadyLink" system provided by Visa USA, Inc., or through a payroll deposit system, or through kiosks at transit stations or various retail locations such as convenience stores, or another system that allows adding value to the account to replenish it with funds to maintain a positive balance.

Such prepaid cards, also referred to as debit cards, can be problematic and to date have not met with widespread approval in the offline environment. Some of the issues associated with prepaid cards relate to the offline nature of the transit fare collection environment (such as discussed in the related patent applications referenced above). Transit fare collection must be conducted offline because of transaction speed and/or connectivity requirements at a transit fare device such as a subway turnstile or bus farebox. There is generally insufficient time to go online to the issuer for transaction approval/decline, and still have time to process thirty to forty-five passengers per minute as required in the transit environment.

Thus, prepaid cards in the offline environment (e.g. transit environment) have all of the problems associated with offline processing of contactless portable consumer devices, including the potential for counterfeiting and the need for stringent "hot list" management to protect for fraud, utilizing strategic hot list management techniques to keep the size of the hot list in check.

In addition to these issues, prepaid cards have one more problem associated with offline processing, such as processing in the transit environment. This problem relates to the unknown balance of the prepaid card account at the time the card is presented for a transaction, such as when presented for a fare purchase in the transit environment. Since the account balance is unknown at the time of card presentation, there is a potential for overdraft and subsequent non-payment by the card issuer if the funds associated with the prepaid card have an insufficient balance or a negative balance.

The unknown balance at the time or presentation is a known problem with prepaid cards, but is made worse in the offline transit fare payment scenario. For example, if the prepaid card were an anonymous gift card that was used to zero account balance and then discarded, it is possible that the discarded prepaid card could still be used in transit until the card number was placed on the hot list of the transit agency. The transit patron with the discarded card would be allowed to enter the transit system without a challenge until such time as the transaction payment was declined by the issuer. Once a payment was declined, the transit agency would place the identification number or card number of the discarded prepaid card on the hot list for subsequent denial of service the next time the discarded prepaid card was presented for use (fare payment). The patron with the discarded prepaid card may obtain one or more days of use from a zero balance (discarded) prepaid card. It is possible that organized fraud may be able to use or sell transit rides using these spent and otherwise discarded prepaid cards dozens if not hundreds of times before the card is placed on the hot list.

Hot lists are necessarily managed in order to keep the size of the list in check. Card numbers cannot remain on the list indefinitely due to memory considerations and the time it takes to look up accounts within the list. Hot list management techniques require removal of card numbers based on time or non-use, and the card number would therefore be removed from the hot list after this period. At that point, the prepaid card would again be available for use in transit because the card number was not on the hot list any longer. This zero-value card could again be used for transit service for one or more days until the card was again placed on the hot list. This process could continue until the card expiration date.

Thus, prepaid cards in the offline environment are subject to issues such as counterfeit containment and hot list management that are associated with offline processing generally. In addition, prepaid cards in the offline environment have the additional issue of unknown or negative balance containment. If such problems with the use of prepaid cards can be solved, the "unbanked" or "underbanked" transit patrons with access to prepaid cards could then enjoy all of the benefits any other transit patron may enjoy through use of a financial payment card. In this discussion, "offline" processing of a transaction refers to a transaction that does not involve communication with an issuer before a user or customer receives the goods or services involved in the transaction.

From the discussion above, it should be apparent that there is a need for transaction processing that can address the issue of unknown balance or negative balance at the time of presentation in an offline transaction processing environment. Embodiments of the present invention satisfy this need.

SUMMARY

Embodiments of the invention are directed to transaction processing techniques that include responding to presentation of a portable consumer device at a reader for offline processing by initiating operation of the portable consumer device, receiving data from the portable consumer device at the reader that indicates the portable consumer device is associated with a prepaid account balance, determining that the portable consumer device is in a negative balance condition, and taking preventive action in response to the negative balance condition such that future acceptance of the portable consumer device at a reader is prevented. This facilitates processing prepaid cards in an offline environment while addressing problems associated with unknown and negative balance conditions for the prepaid card.

Another embodiment of the invention is directed to a portable consumer device comprising a base, and a computer readable medium on the base, wherein the computer readable medium comprises computer readable medium on the base, wherein the computer readable medium stores code for a locking command, wherein the locking command causes the portable consumer device command to respond to a locking instruction sent from a reader to the portable consumer device by executing the stored code such that the portable consumer device will cease responding to a reader activation.

Another embodiment of the invention is directed to a reader that includes a communication interface to a data network and a processor that responds to presentation of the portable consumer device at the reader by initiating operation of the portable consumer device, receiving data from the portable consumer device that indicates the portable consumer device is associated with a prepaid account balance, determines that the portable consumer device is in a negative balance condition, and takes preventive action to prevent future acceptance of the portable consumer device at a reader.

Other objects and advantages of the present invention will be apparent to one of ordinary skill in the art upon review of the detailed description of the present invention and the included figures.

DETAILED DESCRIPTION

As used herein, an "online" transaction generally includes a transaction that would need an electronic authorization response from the issuer before the transaction could be conducted. An "offline" transaction is a transaction that does not require an issuer's response over an electronic communication medium before the transaction is conducted. An example of an offline transaction includes an attempt to gain access to a transit system, such as to a subway facility through a turnstile at a subway station. Another example of an offline transaction is an attempt to gain entry to a facility such as a building or venue through a closed gateway or door. A transaction may be considered "offline" if the decision as to whether or not the user may pass through the turnstile is made without communication involving the issuer, such as at the turnstile or at a computer that is proximate to the turnstile (e.g., at the same locale, such as at the same subway station). That is, the decision as to whether or not the user may pass through the turnstile is not made by the issuer of the portable consumer device. At some point after the user has gained access to the facility, the turnstile or the computer connected to the turnstile will communicate with the issuer so that the issuer may debit the account of the user for the entry or use of the facility.

Processing System

Figure 1:
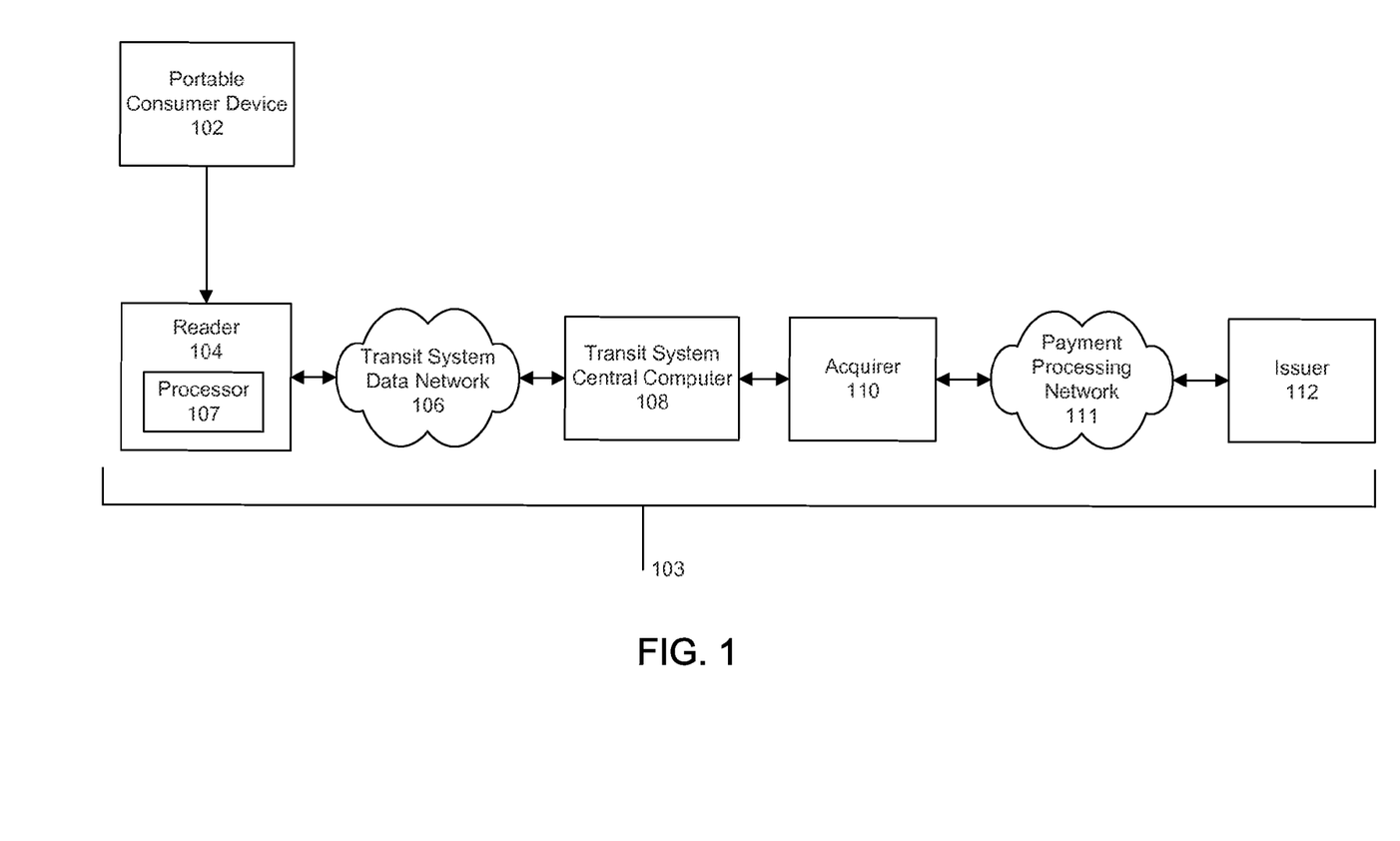
FIG. 1 is a depiction of a portable consumer device and processing system constructed in accordance with the present invention.

FIG. 1 is a depiction of a portable consumer device 102 and a processing system 103 constructed in accordance with the present invention. Although specific components are shown in FIG. 1, systems according to embodiments of the invention may include more or less components than are shown in FIG. 1. For example, although two separate blocks are shown for the issuer 112 and the acquirer 110, it should be understood that a single organization may act as both an issuer and an acquirer in some cases.

The portable consumer device 102 according to embodiments of the invention may be in any suitable form for the processing described herein. For example, the portable consumer device can be hand-held and compact so that it can fit into a consumer's wallet and/or pocket (e.g., pocket-sized). Such portable consumer devices may include prepaid cards or debit cards (with a magnetic strip and without a microprocessor), prepaid smart cards, a token or keychain device (such as the Speedpass™ device commercially available from Exxon-Mobil Corp.), and the like. It should be understood that all embodiments of the portable consumer device as referred to herein comprise prepaid devices that are associated with a prepaid account balance. Those skilled in the art will be familiar with such portable consumer devices and their operation. Other examples of portable consumer devices that can be constructed in accordance with the invention include consumer electronic devices such as cellular phones, personal digital assistants (PDAs), pagers, and the like. Other examples of portable consumer devices 102 include payment cards, security cards, access cards, smart media, transponders, and the like.

For purposes of illustration, embodiments of the invention are described in the context of contactless prepaid cards, but embodiments of the invention are not limited thereto, as noted above. Embodiments of the invention are configured for offline processing of transactions such as payment transactions, access transactions, and the like for which a "prepaid" account balance is decremented with each presentation of the portable consumer device for use. For example, the prepaid account balance could comprise credits or a usage tally that can be used for a non-financial transaction such as gaining access to a secure building or a venue where a ticket has already been prepaid. In the context of this description, the contactless prepaid card will be described in connection with readers of a transit fare collection system. Other offline systems in which the embodiments are useful include venue entrance locations, turnstiles, building entrances, vending machines, secured access areas, and the like.

In embodiments of the invention, the contactless prepaid card typically communicates with a reader that is part of a transit system fare collection mechanism using a short range communication method, such as a near field communications (NFC) capability. Examples of such NFC technologies include ISO standard 14443, RFID, Bluetooth™ and infrared communications methods. A contactless prepaid card typically comprises a base and a computer readable medium. The computer readable medium can include logic circuitry and an antenna for contactless communication. If the prepaid card is a smart card, then the card may include a microprocessor to perform smart card functions. The computer readable medium may be in the form of a memory chip, magnetic stripe media, and the like. Some contactless prepaid cards may also have both an antenna for contactless-type transactions and a magnetic stripe or electrical contacts for contact-type transactions.

Referring to FIG. 1, processing in accordance with the invention is initiated when the portable consumer device 102 is presented for use and is read by the reader 104, which may be a contactless reader at a fare collection or venue entrance point. The offline transactions may or may not be offline payment transactions. The reader 104 includes a communication interface to a data network 106 and a processor 107 that responds to presentation of the portable consumer device at the reader by initiating operation of the portable consumer device, receiving data from the portable consumer device that indicates the portable consumer device is associated with a prepaid account balance, determines that the portable consumer device is in a negative balance condition, and takes preventive action to prevent future acceptance of the portable consumer device at a reader. These operations are described further below in conjunction with the drawing figures.

Although the reader 104 in this example is described as a contactless reader, it is understood that a contact-based reader (e.g., a magnetic stripe reader with a card-receiving slot) could be used in other embodiments of the invention.

In a typical offline transaction, the portable consumer device 102 interacts with the reader 104. The reader 104 detects presentation of the portable consumer device 102 and initiates operation. Typically, the reader communicates with the portable consumer device and performs a data exchange with the device that is sometimes referred to as a "wake up" operation. As a result of the "wake up" call from the reader, the portable consumer device sends magnetic stripe track data including Primary Account Number (PAN) information, expiration date, service codes, and the like associated with the portable consumer device 102. The reader 104 (which may be considered to be a transit fare collection device in some cases) may also have any encryption keys and associated algorithms for processing the data, and thus in some cases may authenticate the portable consumer device 102 at the time of the transaction with no online processing. If the received data is validated at the reader 104 and the device has no blocking or locking codes, and no other operations occur that would prevent authentication, then the user presenting the portable consumer device 102 is allowed access to conduct the transaction (e.g., pay a fare and gain entry into a transportation system).

Payment processing may be performed as defined by the transit agency. Payment models implemented with the card can include a variety of schemes, such as pay-as-you-go, one transaction at a time; aggregation of many transactions into an aggregated amount based on time or value; and pre-pay accounting, where a proxy account is created and is reduced by each transaction amount until a replenishment of the proxy account is required based on time or value. After the payment processing is complete, the transit agency computer 108 processes the payment total through the acquirer 110 and a payment processing network 111 (e.g., VisaNet™) for approval or decline by the issuer 112. Any of the transit system data network 106, the transit system central computer 108, the acquirer 110, the payment processing network 111, and the issuer 112, may have suitable computational apparatuses and computer readable media suitable for performing any of the functions described herein.

Negative Balance Processing

Figure 2:
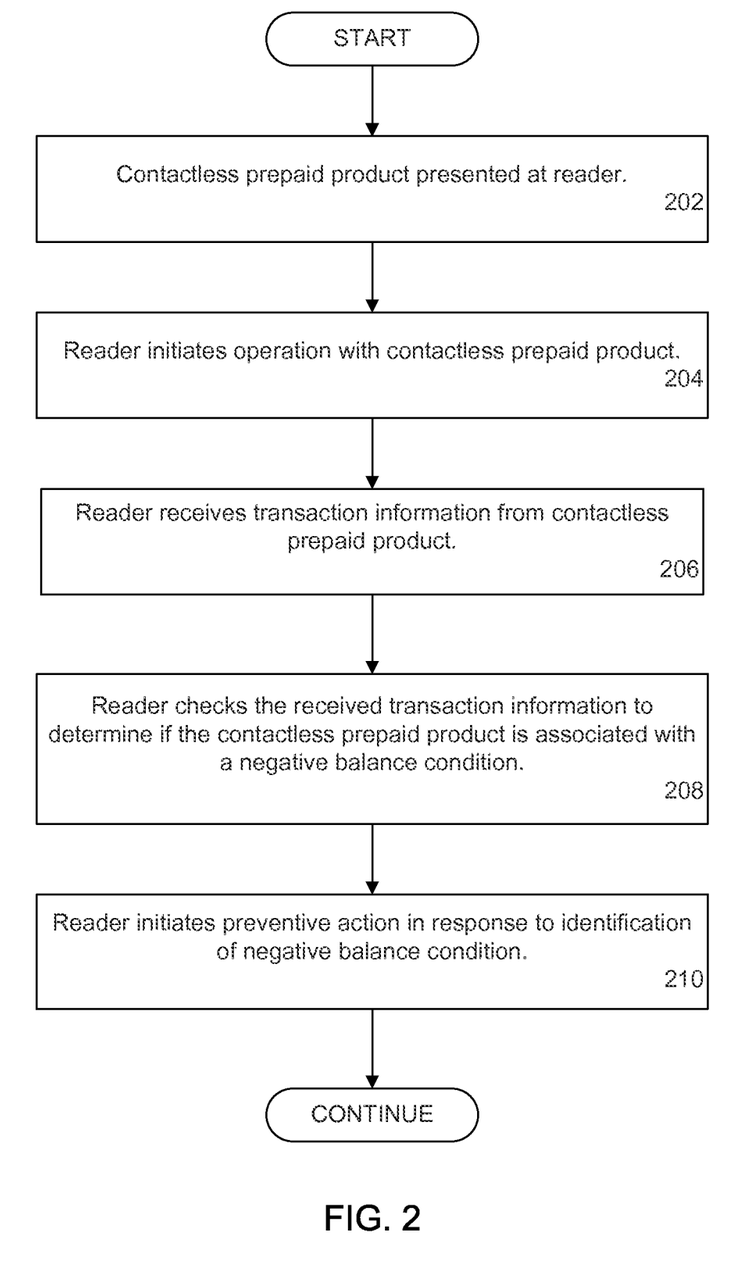
FIG. 2 is a flow diagram representation of reader processing in the FIG. 1 system.

FIG. 2 is a general flow diagram representation of the transaction processing that can be performed by the system shown in the FIG. 1. The operations depicted in FIG. 2 relate to negative balance processing. As noted above, one distinguishing characteristic of the offline processing for prepaid products, as compared with offline payment cards and the like, is that prepaid products are not associated with an account for charging, but rather are associated with a prepaid account balance, against which charges are deducted as they are incurred. Thus, offline processing of prepaid products must successfully deal with negative balance conditions in which the prepaid account balance associated with a particular prepaid product does not have sufficient funds for the current charge.

In the first FIG. 2 operation, represented by the flow diagram box numbered 202, the contactless prepaid product is presented at the reader. As noted above, although the portable consumer device is referred to in this description as a contactless prepaid product, the portable consumer device can be embodied in a variety of products, and may be in any suitable form for the processing described herein. Such products may include, for example, prepaid cards or debit cards (with a magnetic strip and without a microprocessor), prepaid smart cards, a token or keychain device (such as the Speedpass™ device commercially available from Exxon-Mobil Corp.), and the like. In the initial operation 202, the reader senses or detects the presence of the contactless prepaid product.

In response to sensing the presence of the contactless prepaid product, at the next operation, box 204, the reader initiates operation with the contactless prepaid product. Such operation is typically an operation in which the reader sends a signal to the contactless prepaid product to "wake up" the product and initiate data exchange. As part of the wake up, the reader sends a request to the contactless prepaid product for predetermined transaction information. In conjunction with the wake up processing 204, the reader will perform offline authorization processing to determine if the contactless prepaid product is authentic and authorized for use.

If the contactless prepaid product has not previously been refused or placed on a hot list or the like, described further below, then at box 206 the requested transaction information is received, and typically includes data such as current prepaid product status, product identification number, account identifier, issuer information, prepaid account balance amount, and the like. The contactless prepaid product is not usually associated with a particular person or owner, so the received information does not typically include any identification information relating to the bearer of the contactless prepaid product.

At box 208, the reader checks the received transaction information and, if all is in order, the bearer of the contactless prepaid product (that is, the person who presented the product) is approved for entry and use is permitted. If the reader checks the received transaction information, it might determine that the contactless prepaid product is associated with a negative balance condition. Because of the offline nature of reader operations as described herein, the determination of a negative balance condition is not performed using communication with the prepaid account issuer in response to the received transaction information. Thus, the negative balance processing in response to the received transaction information that occurs in the FIG. 1 illustrated system does not occur at the issuer 112. A negative balance condition may be identified by a prepaid account balance amount that is not greater than zero or is otherwise insufficient to cover a current transaction, or may meet other parameters for identification as a negative balance condition.

Checking for a negative balance condition may involve predictive processing. For example, a negative balance condition may be indicated if the prepaid account balance is less than a threshold value, such as a value that is less than the maximum fare on a transit system, or a negative balance condition may be indicated if the prepaid account balance is less than a threshold amount determined by predictive processing. Thus, the predictive processing may involve checking a customer's charging history or ridership history to examine historic patterns of use (charging) and to predict future uses (charges) of the prepaid account. If the predictive processing identifies a situation where the next anticipated charge to the prepaid account, or other threshold condition, will result in an imminent insufficient account balance to cover the anticipated charge, then that situation is classified as a negative balance condition The predictive processing may occur after the contactless prepaid product has been presented. That is, in the offline processing, the contactless prepaid product may be presented and passage may be granted. In later online processing by the agency settling with the contactless prepaid product, an authorization approval message may be received from the product issuer or other associated financial institution. The approval message may also include remaining balance information. That remaining balance information could be used by the agency as an advanced warning that the prepaid account balance of the contactless prepaid product is low. For example, using advanced customer behavior modeling, such as with neural network techniques, the fare collection system (FIG. 1) might incorporate the remaining balance information, or other patron behavior information, to assign a "score" for the risk associated with the contactless prepaid product and the agency may decline a transaction (or a particular contactless prepaid product) in advance of receiving an issuer authorization decline. Thus, the system could assign a negative balance condition to the contactless prepaid product based on predictive processing, so that the prepaid product would be placed on a hot list or the like and subsequent presentation of the prepaid product would be met with refusal. Other indicators of a negative prepaid account balance can be selected according to system requirements and operational standards, and will be known to those skilled in the art.

If the reader determines that the contactless prepaid product is associated with a negative balance condition, then at box 210 the reader initiates preventive action. The preventive action will cause operations to occur such that future acceptance of the portable consumer device at a reader is prevented. For example, the preventive action may comprise placing the contactless prepaid product on a black list or hot list of accounts that will not be authorized for future transactions. The preventive actions in response to a negative balance condition may include, but are not limited to, blocking data from being read from or written to a file or memory store in the contactless prepaid product, or locking the prepaid product with a lock command that sets or resets the lock condition, or blocking operations of the prepaid product.

Whether the negative account balance information is learned online in settlement processing, or at the turnstile at the time of presentation, the preventive action can include writing appropriate parameters or data to a specific memory location of the contactless prepaid product or can include executing a locking command to initiate a set of product operations to prevent the product from communicating with the reader.

Writing parameters or data to the contactless prepaid product may include, for example, the use of blocking data. The use of blocking data may involve writing a blocking bit. Techniques for using a blocking bit in the context of transit fare collection is described, for example, in "Fraud Prevention for Transit Fare Collection" to A. Hammad et al. U.S. patent application Ser. No. 11/680,589 filed Feb. 28, 2007. In the context of contactless prepaid products, a blocking bit is useful because of its ability to keep prepaid products out of circulation once a zero value is reached or an issuer decline is received.

The aforementioned "Fraud Prevention" patent application to A. Hammad et al. discusses a single blocking byte of data to be used by the agency fare processing device. Normally this byte is reset to indicate "unblocked" on the card. Once the card is discovered on the hot list, this byte is set to "block". Once set to "block", the product number associated with the contactless prepaid product may be removed from the agency hot list. Even if the prepaid product were again used some time later (after the number may have been removed from the hot list), the blocking data on the product is still set to "block" and therefore the card is not usable. Other aspects of using the blocking bit for contactless prepaid products and for controlling access to the blocking bit will occur to those skilled in the art in view of this discussion.

For example, one refinement of the concept could include that no access privileges are required to set or unset the blocking data in the file on the prepaid product. That is, the blocking bit is "open access" and the blocking data can be read and written freely by any agency fare device with a contactless reader. No key management is necessary, and the blocking data is available from one agency to the next. Thus, all agencies are helped with product management. Nevertheless, the fact that anyone can gain access and set the prepaid product status to "unblocked" means that a hacker or other person intent on fraud could also set the data appropriately, and use the card at will. This refinement by itself would not prevent organized fraud, but would prevent zero value cards from being continually used in transit by any patron that discovers the negative list management techniques.

In this way, the "open access" blocking bit refinement also has the potential for being susceptible to a denial-of-service attack by anyone that had a contactless reader that could then set the blocking bit status to "block" on any prepaid product. This could occur even if a person performing a prank had a handheld reader/writer set up to change the status on any prepaid product it comes in contact with. Without key management or control over access to the blocking file on the prepaid product, anyone with the properly programmed apparatus could change the blocked status and wreak havoc on the system.

Another refinement of the blocking bit concept is to set access privileges based on symmetric key (e.g. 3DES) access. As long as the agency has the secret keys to read and write the blocking data, they can make use of the blocking file to control use of the prepaid product in their system. The secret keys for this file would have to be shared amongst issuers (to establish the keys and files on the prepaid product at the time of personalization) and also the transit agencies (to read and write in order to check or block the prepaid product at the time of use in transit). Fraudulent access to these secret keys should be minimal, thus minimizing organized fraud. It should be apparent that key management would be necessary to protect the secret keys.

Yet another refinement of the blocking bit concept for contactless prepaid products is to use public key authentication (e.g. RSA or Elliptic Curve), such that only after authentication of the prepaid product may the contents of the file be accessed to indicate or update the blocking status. This technique may be used in conjunction with code verification techniques for authentication such as mentioned above with respect to "Verification of a Portable Consumer Device in an Offline Environment" to A. Hammad et al. U.S. patent application Ser. No. 11/680,592 filed Feb. 28, 2007 and "Authentication of a Data Card Using a Transit Verification Value" by A. Hammad et al. U.S. patent application Ser. No. 11/680,594 filed Feb. 28, 2007. Other techniques may involve a completely separate authentication mechanism specific to the blocking file. The separate authentication minimizes the opportunity for organized fraud for changing the blocking status at will.

As noted above, the contactless prepaid product is not limited to embodiments comprising a debit card or the like. The prepaid product may comprise a wireless communication device, such as a cellular telephone, smart phone, personal digital assistant (PDA), or similar device with a prepaid account balance application, so that the prepaid product has both the functionality of a debit card with respect to a prepaid account balance and charges made via NFC (near field communications), and also has the functionality of the host device (i.e., cellular telephone, smart phone, PDA, etc.), thereby acting as a payment device. With such prepaid products, the payment device could be blocked using over-the-air (OTA) communication analogous to the blocking bit. The OTA capability is described, for example, in "Mobile Transit Fare Payment" to A. Hammad et al. U.S. patent application Ser. No. 11/536,296 filed Sep. 28, 2006. In this regard, it is noted that the ease and immediacy of OTA blocking is one advantage of a prepaid product such as a wireless communication device acting as a payment device. That is, once the balance of a prepaid account balance associated with a prepaid product such as a wireless communication device enters a negative balance situation, the device can be blocked OTA utilizing key access established between the device and the issuer or agency. Such blocking can also be implemented in connection with processing between the chip of a debit card or the like.

As noted above, the preventive action in response to a negative account balance condition at box 210 can include executing a locking command to initiate a set of product operations to prevent the product from communicating with the reader. This technique makes use of a new command transmitted to the prepaid product from the contactless reader. The new command to the prepaid product is used to instruct the prepaid product to write the blocking status to "block" or "unblock" as desired. Without some control over the ability to send this command, anyone with the properly programmed apparatus could send the command to block or unblock any card as they wished with the same negative consequences discussed above for the file access control. To manage use of the blocking command, blocking codes can be sent to the prepaid product for control over who may use the blocking command and time limits associated with use of the blocking command.

For example, if the transit agency wishes to block the prepaid product, say as a result of a prior authorization decline due to a negative balance, or to remove the card from the hot list to save memory space, the fare device reader issues a "blocking" command to the prepaid product through the contactless interface of the reader. The issuer establishes one-time control codes for the prepaid product, and sends these codes to the transit agency to be used with the blocking command to allow blocking on the prepaid product. Anyone intent on committing a prank or otherwise interrupting processing would not likely have the code and be able to perform any denial-of-service blocking.

To "unblock" the prepaid product and allow its use in the offline environment of transit again, the reader cannot independently issue an unblock command. That is, the bearer of the product would need to go to a designated location such as a transit authority customer service location or a bank branch office or issuing financial institution having online communication capability with the issuer. Upon resolution of the negative balance, an "unblock" command would be issued to the prepaid product. This may require an in-person visit to a staffed location having suitable communication components where credentials and account status may be verified before a prepaid product is changed back to "unblock" status. That is, the prepaid product will not respond to an offline activation when it is in the blocked condition, but will respond to an activation from an online source that is in communication with the issuer or directly from the issuer. Thus, the online source can unblock the prepaid product. In the case of a prepaid product comprising a wireless communication device, the unblock activation can be received in an over-the-air communication from the online source.

Just as the debit card concepts above were analogously applied to smart phones or cellular telephones, the blocking command feature of the debit card could be applied to OTA embodiments. The OTA implementation would eliminate or simplify the need to send codes from the issuer to the agency, as this could be accomplished over the cellular network instead. See, for example, "Mobile Transit Fare Payment" to A. Hammad et al. U.S. patent application Ser. No. 11/536,296 filed Sep. 28, 2006. In the context of a cellular telephone implementation, once the account balance on a prepaid product associated with the cellular telephone goes into a negative balance condition, it can be blocked via OTA techniques utilizing commands established between the prepaid product of the cellular telephone and the issuer or agency of the prepaid product.

Reader Processing

Figure 3:
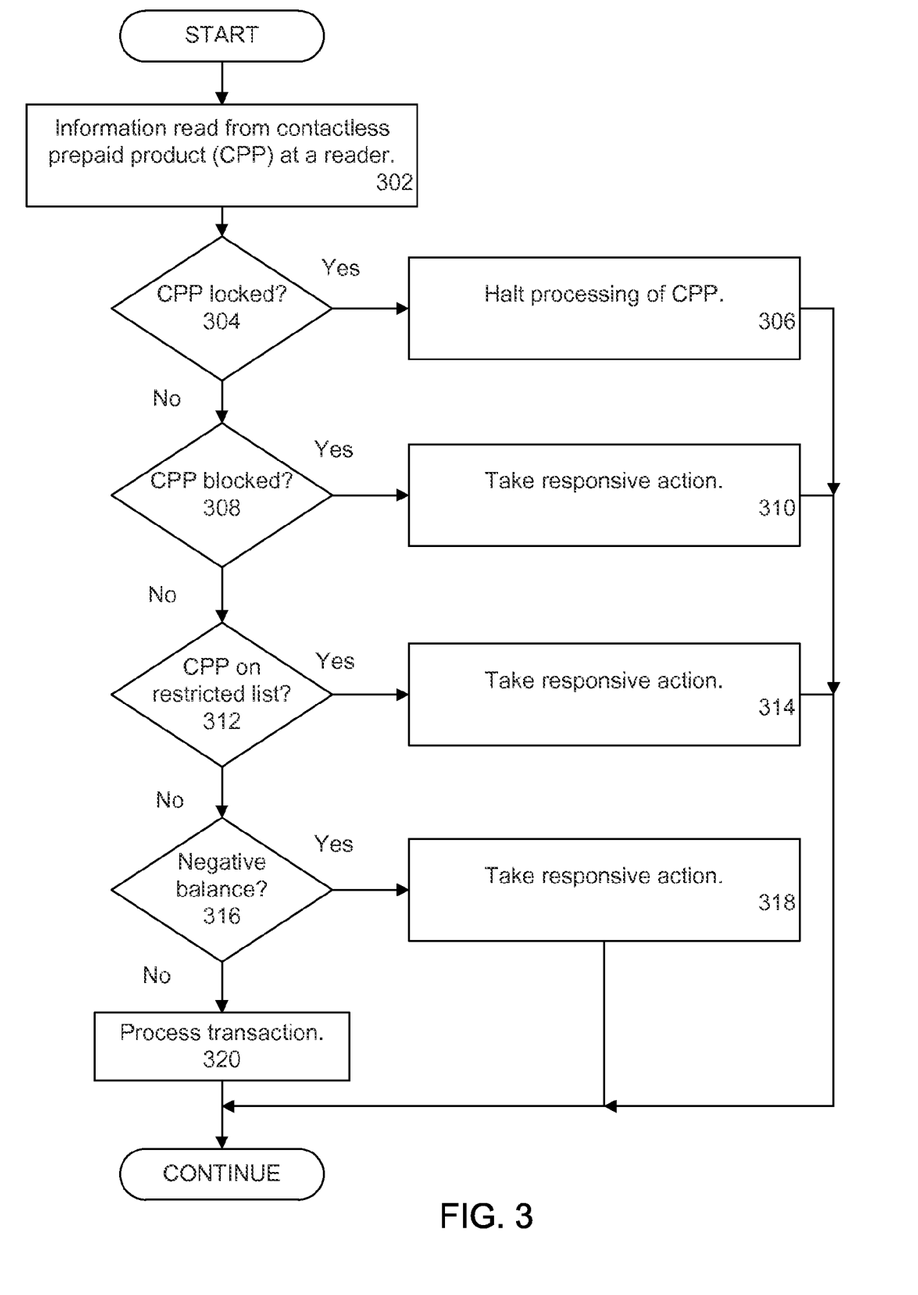
FIG. 3 is a flow diagram representation of transaction processing in the FIG. 1 system.

FIG. 3 is a flow diagram representation of transaction processing in the FIG. 1 system upon presentation of a prepaid portable consumer device at a reader. In the first operation, represented by the flowchart box numbered 302, a prepaid portable consumer device such as a contactless prepaid product (CPP) is presented at a reader and the CPP information is read by the reader. At the next operation, block 304, the reader checks to determine if the CPP has been locked. The CPP will be locked if the CPP has received a lock command from a previous reader. As described above, the lock command causes the CPP to execute locking code stored in the CPP and be unresponsive to reader requests for information. Thus, the CPP will not respond to any commands from the offline reader and will not provide any information. Details of the locked condition may be specified by the issuer, but it is anticipated that most issuers will permit locked cards to be reactivated upon resolution of the prepaid account balance at a staffed transit location or other facility at which online communication with the issuer financial network is possible. Alternatively, an issuer may decide that a locked CPP is to be considered irretrievably broken and no restorative procedure will be permitted. In either case, no information will be provided by the CPP to the reader other than its status as "locked". Thus, locking a card results in a reader much more quickly determining that a presented CPP should not be authorized, as compared to a CPP that is simply blocked. In any case, a locked CPP cannot be accepted for processing by any offline reader of a transit agency.

If the reader determines that the CPP is locked, an affirmative outcome at the decision block 304, the reader will halt processing of the CPP at box 306, and then other system processing may continue. If the CPP is not locked, a negative outcome at the decision box 304, then the reader next checks to determine if the CPP is blocked (box 308). The status of a CPP as blocked is indicated by particular data values that are included with transaction information provided to the reader in response to the wake up operation. Thus, a blocked CPP will generally provide the reader with predetermined transaction information relating to current prepaid product status, product identification number, account identifier, issuer information, prepaid account balance amount, and the like. If the transaction information indicates to the reader that the CPP is blocked, an affirmative outcome at the box 308, then at box 310 the reader takes responsive action. The responsive action is generally to simply refuse the CPP and not grant access to the patron who presented the CPP. Other responsive actions may be suitable and may be taken according to system requirements. Other system operations may then continue.

If the reader determines that the CPP is not blocked, a negative outcome at the decision box 308, then at the box 312 the reader checks to determine if the CPP is on a restricted list, such as a hot list, or black list, or white list, or any other list that mandates particular processing for the CPP. If the CPP is on such a list, an affirmative outcome at the box 312, then the reader carries out responsive processing 314. For a restricted list, the responsive processing 314 may comprise, for example, refusal of entry and denial of the transaction. Other responsive actions may be suitable and may be taken according to system requirements. Other system operations may then continue.

If the reader determines that the CPP is not on a restricted list, a negative outcome at the decision box 312, then at the decision box 316 the reader determines if the prepaid account balance is at a negative balance condition. As noted above, the negative balance condition may involve an account balance that is less than zero, or it may involve predictive processing that indicates the CPP account balance does not have sufficient funding to cover a threshold level of anticipated future charges.

If the reader determines that the CPP is not in a negative balance condition, a negative outcome at the decision box 316, then at box 320 the reader performs further processing of the CPP, such as authorization and charge. Other system operations may then continue.

Counterfeit Containment

In addition to negative balance processing, the contactless prepaid product can incorporate additional features for safeguarding use. These features can include, for example, counterfeit containment features.

For counterfeit containment, a verification code can be added to an otherwise conventional contactless prepaid product that can be validated at a transit fare device. Validation of this code provides a mechanism for verification of the contactless prepaid product authenticity at the time of use. If the prepaid product can be verified as authentic, then the potential for counterfeiting of debit cards and the like for use in the off-line transit environment is minimized. The verification code is designed to prevent runaway fraud with the use of counterfeit cards that may be able to change the cardholder PAN with each use and therefore cannot be contained by standard hot list approaches. Although the counterfeit card may be able to change the PAN with each use, the verification value based on keys and an algorithm would not prove valid and the transaction may be denied at the fare device.

The verification code feature as implemented in portable consumer devices generally is described in "Verification of a Portable Consumer Device in an Offline Environment" to A. Hammad et al. U.S. patent application Ser. No. 11/680,592 filed Feb. 28, 2007 and "Authentication of a Data Card Using a Transit Verification Value" by A. Hammad et al. U.S. patent application Ser. No. 11/680,594 filed Feb. 28, 2007.

Another feature that can be implemented in the contactless prepaid product for safeguarding use, in addition to negative balance processing, is that of restricted list management. Such lists are also generally referred to as hot lists or negative lists.

The hot list is the primary tool used in the offline environment to deny use of a portable consumer device based on use of the PAN (primary account number) as the unique identifying information. A list of invalid PANs would be searched during the transaction at the transit fare device, and if on the list, the transaction would be denied. Hot list sizes in the transit environment typically range from 20,000 to 1 million. Transit fare devices will have a limited memory to hold lists, and the time available to search the list during transaction time will allow only a limited file size. This requires creative and strategic hot list management techniques to add and remove card numbers to maintain the list hot size. The PAN feature can be implemented in conjunction with the contactless prepaid product described herein, such that the PAN refers to the prepaid product identifier, such as a debit card number or the like, as will be known to those skilled in the art in view of this description. The transit agency can apply hot list management techniques to the contactless prepaid product hot list processing for control of negative list size.

One technique for managing hot list entries is that, once a PAN (e.g., prepaid product identification number) is on the hot list, the PAN will be removed if no further transactions with the prepaid product occur for a predetermined number of days; a prepaid product may be added back to the hot list if another decline or refusal action is received for the prepaid product. Another hot list technique is to check if the PAN is used more than a predetermined number of times within a preselected number of minutes or hours. If such use has occurred, then the prepaid product is placed on the hot list. Allow its use again the next day. Another technique is to present a declined transaction back to the issuer to check if the prepaid account balance is still invalid. If the charge against the prepaid account is authorized on the re-presentment, then the prepaid product is removed from the negative list For increased security in processing, it is generally not possible to remove a prepaid product from the hot list other than with these or other similar hot list management rules. A contactless prepaid product is also generally removed from the hot list at the time of prepaid product expiration. Such practices serve to insure a hot list prepaid product is never used in the transit agency again, to limit exposure of the agency to non-payment, and also make efficient use of the hot list.

While not on the hot list, the prepaid product could perform dozens or hundreds of illegal transactions by an organized fraud operation. In addition, the prepaid product could be used at any other agency, and the same process could ensue, even though the prepaid product would not be valid for use at the first agency. Furthermore, if the invalid prepaid product were stored unused until after the list management rules stated above expired, it is possible the prepaid product could again be used for dozens or hundreds of illegal transactions until it again found its way to the agency hot list.

Quick updates to the hot list with the use of high speed networks within fare collection systems may allow hot list updating in a rapid fashion (i.e. minutes). The worst case scenario for the transit environment is the processing of transactions on buses that may not provide data updates, or receive hot list updates, more than once per day. These issues are discussed more fully, in the context of portable consumer devices generally, in "Fraud Prevention for Transit Fare Collection" to A. Hammad et al. U.S. patent application Ser. No. 11/680,589 filed Feb. 28, 2007.

Figure 4:
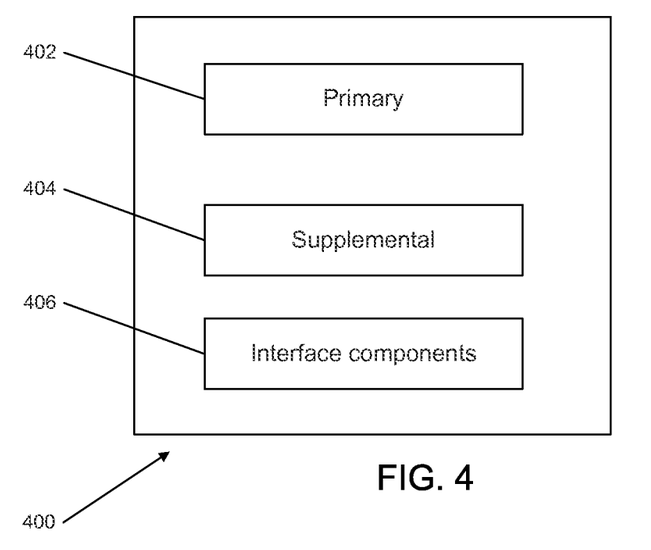
FIG. 4 is a depiction of the portable consumer device illustrated in FIG. 1.

As noted above, the feature of a verification code for portable consumer devices was discussed in "Verification of a Portable Consumer Device in an Offline Environment" to A. Hammad et al. U.S. patent application Ser. No. 11/680,592 filed Feb. 28, 2007. FIG. 4 illustrates a portable consumer device 400 that can be implemented as a prepaid product constructed in accordance with the present invention. The device 400 can be provided in a variety of prepaid product forms, for example, so that it can be hand-held and compact to fit into a consumer's wallet and/or pocket (e.g., pocket-sized). Suitable portable consumer devices may include smart cards, ordinary credit or debit cards (with a magnetic strip and without a microprocessor), a keychain device (such as the Speedpass™ device commercially available from ExxonMobil Corp.), and the like. Other examples of portable consumer devices that can be associated with prepaid accounts and that can be constructed in accordance with the invention include wireless cellular telephones, personal digital assistants (PDAs), pagers, payment cards, security cards, access cards, smart media, transponders, and the like, configured for compatible operation in the processing illustrated in FIG. 1.

FIG. 4 shows that the portable consumer device 400 includes a primary (issuer) verification value 402 for online issuer verification and a supplemental verification value 404 for the offline processing described herein. The portable consumer device also includes interface processing components 406 such as processors and the like for proper functioning and data exchange. For example, a portable consumer device 400 comprising a transit smart card will include interface components that enable communication with offline readers of the transit system and will include the appropriate supplemental verification value for successful operation. A portable consumer device 400 such as a token or keychain device will include interface components for communication with the offline token/keychain reader and will include the appropriate supplemental verification value. A portable consumer device 400 such as a wireless communication device will include interface components for communication with the offline reader and will include the appropriate supplemental verification value for successful operation with the offline reader and associated processing system, along with components for the wireless device operation.

Figure 5:
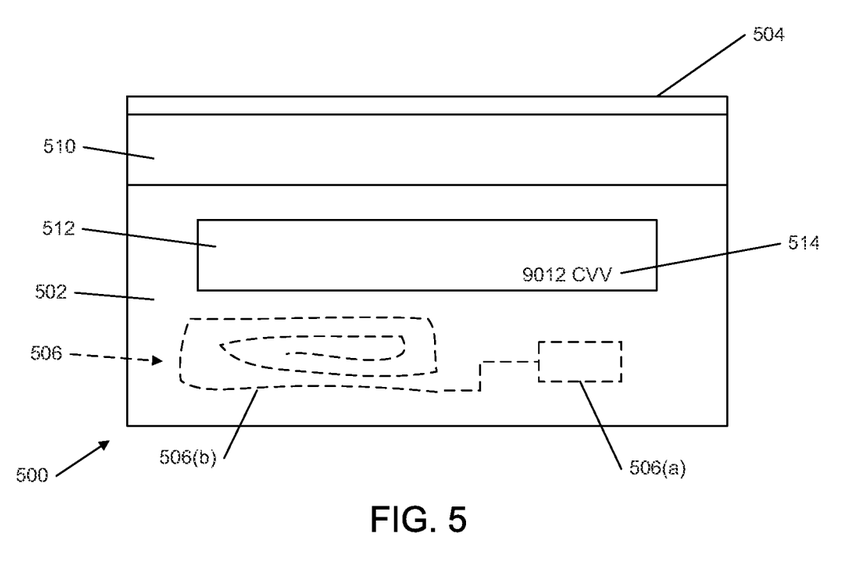
FIG. 5 is an illustration of a portable consumer device of FIG. 4 comprising a contactless smart card constructed in accordance with the invention.

FIG. 5 shows an embodiment in which the portable consumer device comprises a prepaid product implemented as a contactless smart card 500 for use in a transit system. FIG. 5 shows the reverse face 502 of the smart card 500. The smart card includes a base 504, which may be a plastic substrate. In other portable consumer devices, the base may comprise a structure such as a housing or internal circuit board, if the portable consumer device is a wireless phone or personal digital assistant (PDA) or keychain device. The card 500 includes a computer readable medium 506 comprising an interface for communication with the offline reader of the associated transit processing system. The computer readable medium 506 can comprise a processor or logic chip with memory 506(a) and an antenna element 506(b). The antenna element is generally provided in the form of a coil and may be embedded within the base 504. The antenna element 506(b) may be powered by an internal or external source to allow for the contactless transmission of data to a card reader. The processor with memory 506(a) stores the supplemental verification value described herein and can also be used to store Track 1 and Track 2 data, and the issuer verification value associated with conventional payment systems. In FIG. 5, the processor and memory 506(a) and the antenna 506(b) are both embedded within the base 504 and therefore are illustrated in dotted line.

If desired, the reverse face 502 of the card 500 can include magnetic media or material 510 to store data for processing with a contact-type (online) reader of a payment system. Beneath the optional magnetic media 510 on the reverse face 502 is a signature block 512 on which the cardholder signature is written, and printed on the signature block is a four-digit card number value (shown as "9012" in FIG. 5) and another three-digit CVV value 514 for typical online financial transaction processing.

It should be understood that certain elements of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of processing a transaction, the processing method comprising:
   responding to a presentation of a portable consumer device at a reader device by initiating operation of the portable consumer device, wherein the portable consumer device operates in a locked status or a not locked status, wherein the portable consumer device comprises a wireless communication device;
   receiving data from the portable consumer device for a current transaction at the reader device, wherein the received data indicates the portable consumer device is associated with an account;
   determining that an account balance associated with the account is in a negative balance condition in response to predictive processing that determines a next anticipated charge to the account balance and identifies a situation in which the next anticipated charge to the account balance will result in an insufficient account balance to cover the next anticipated charge; and
   taking preventive action at the reader device in response to the negative balance condition such that future acceptance of the portable consumer device at any reader device is prevented, wherein taking preventive action comprises issuing a lock command from the reader device to the portable consumer device, wherein the locking command is set at the portable consumer device;
   wherein setting the locking command comprises an instruction sent from the reader device to the portable consumer device that causes the portable consumer device to execute a locking code that causes the portable consumer device to be unusable for subsequent transactions at the reader device, wherein the portable consumer device receives the locking command in an over-the-air communication, and
   wherein the preventive action is not taken if the account balance was not determined to be in the negative balance condition.

2. The method of claim 1, wherein taking preventive action comprises setting a blocking bit in a memory location of the portable consumer device.

3. The method of claim 1, wherein determining that the account balance associated with the account is in the negative balance condition comprises initiating a predictive analysis that determines if the portable consumer device has the insufficient account balance for an expected future account activity.

4. The method of claim 3, wherein the predictive analysis comprises processing that assesses past account activity of the portable consumer device and determines a value for the account balance below which comprises the negative balance condition such that the account balance is not sufficient for the expected future account activity.

5. The method of claim 1, wherein determining that the account balance associated with the account is in the negative balance condition is performed by the reader device.

6. A portable consumer device comprising:
a base; and
a memory comprising a computer readable medium disposed on or within the base, the computer readable medium comprising code for a locking command, wherein the portable consumer device operates in a locked status or a not locked status, wherein the locking command causes the portable consumer device to respond to a locking instruction sent from a reader device to the portable consumer device, wherein the portable consumer device is associated with an account, and wherein the locking instruction is generated in response to predictive processing that determines an account balance associated with the account is in a negative balance condition in response to determining a next anticipated charge to the account balance and identifying a situation in which the next anticipated charge to the account balance will result in an insufficient account balance to cover the next anticipated charge.

7. The portable consumer device of claim 6, wherein the portable consumer device will respond to an activation from an online source.

8. The portable consumer device of claim 6, wherein the portable consumer device comprises a wireless communication device.

9. The portable consumer device of claim 8, wherein the wireless communication device receives the locking command in an over-the-air communication.

10. The portable consumer device of claim 8, wherein the wireless communication device responds to an activation received from an online source in an over-the-air communication.

11. The portable consumer device of claim 8, wherein determining that the account balance associated with the account is in the negative balance condition is performed by the reader device.

12. A reader device configured to receive data from a portable consumer device, wherein the reader device includes:
a communication interface to a data network; and
a processor that responds to a presentation of the portable consumer device at the reader device by initiating operation of the portable consumer device, wherein the portable consumer device operates in a locked status or a not locked status, wherein a locking command causes the portable consumer device to respond to a locking instruction sent from the reader device to the portable consumer device, wherein the portable consumer device is associated with an account, and wherein the locking instruction is generated in response to predictive processing that determines an account balance associated with the account is in a negative balance condition in response to determining a next anticipated charge to the account balance and identifying a situation in which the next anticipated charge to the account balance will result in an insufficient account balance to cover the next anticipated charge.

13. The reader device of claim 12, wherein the reader device takes preventive action by setting a blocking bit in a memory location of the portable consumer device.

14. The reader device of claim 12, wherein taking preventive action comprises setting the locking command at the portable consumer device.

15. The reader device of claim 14, wherein setting the locking command comprises an instruction sent from the reader device to the portable consumer device that causes the portable consumer device to execute a locking code that causes the portable consumer device to cease responding to a reader device activation.

16. The reader device of claim 12, wherein determining that the account balance associated with the account is in the negative balance condition comprises initiating a predictive analysis that determines if the portable consumer device has the insufficient account balance for an expected future account activity.

17. The reader device of claim 16, wherein the predictive analysis comprises processing that assesses past account activity of the portable consumer device and determines a value for the account balance below which comprises the negative balance condition such that the account balance is not sufficient for the expected future account activity.

* * * * *